E. W. POTTS.
POWER TRANSMISSION MECHANISM.
APPLICATION FILED OCT. 6, 1913.
1,285,370.
Patented Nov. 19, 1918.
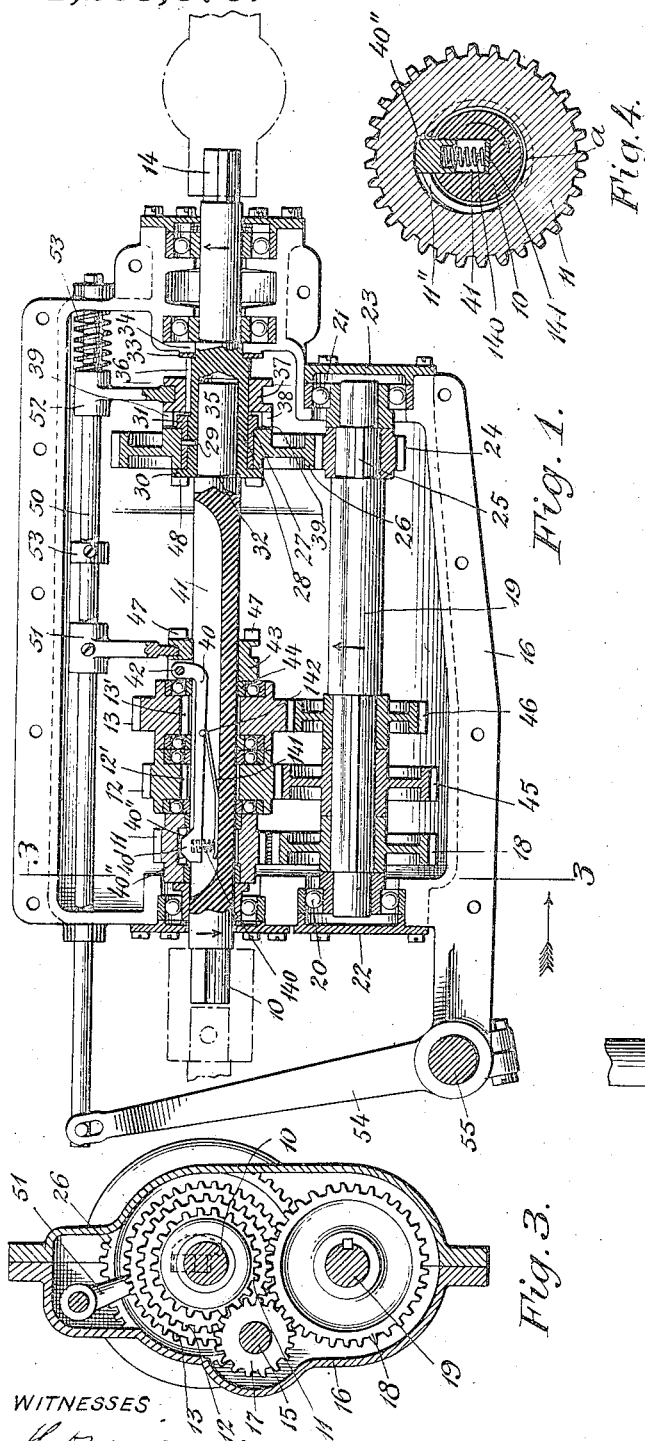
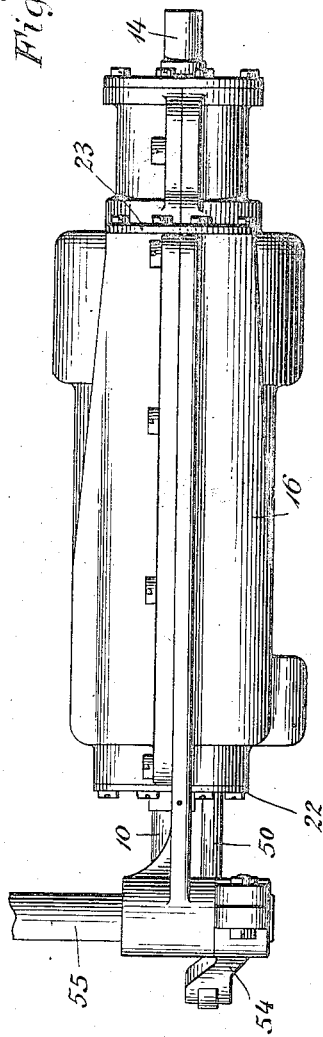
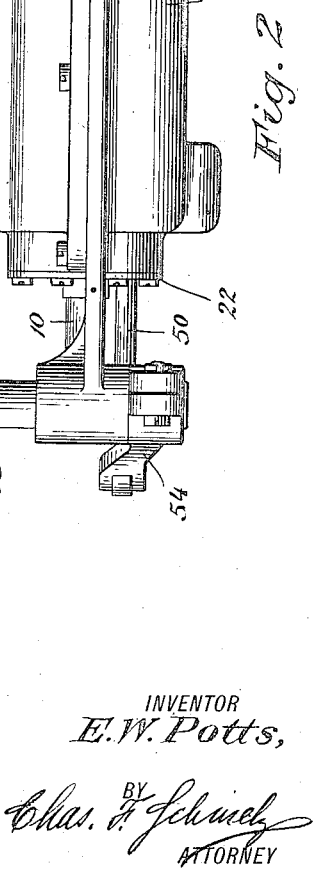
WITNESSES
INVENTOR
E. W. Potts,
BY
Chas. F. Schmelz
ATTORNEY

UNITED STATES PATENT OFFICE.

ELIJAH W. POTTS, OF DETROIT, MICHIGAN, ASSIGNOR OF ONE-HALF TO JONATHAN A. ZAHN, OF DETROIT, MICHIGAN.

POWER-TRANSMISSION MECHANISM.

1,285,370.

Specification of Letters Patent.

Patented Nov. 19, 1918.

Application filed October 6, 1913. Serial No. 793,534.

*To all whom it may concern:*

Be it known that I, ELIJAH W. POTTS, a citizen of the United States, residing at Detroit, in the county of Wayne and State of Michigan, have invented certain new and useful Improvements in Power-Transmission Mechanism, of which the following is a specification.

This invention relates to power transmission mechanism and especially to that class thereof which are used in connection with hydro-carbon engines and which are adapted to transform or vary the speed of the driven member or shaft relatively to the driving shaft of the engine or other motor, this transformation being in certain fixed proportions in accordance with the size of the gears in use.

The invention has for one of its objects the provision of an improved device of this character in which the engine or motor shaft has a plurality of gears which are normally loose upon said shaft, but may be respectively corotatively connected therewith for driving a jack shaft, the latter imparting motion, through a set of gears, to the driven shaft which may be connected with the differential of an automobile or other vehicle and be driven in various speed forward, and also in a reverse direction.

The invention has, furthermore, for its object the provision of an improved mechanism in which the gear driven by the jack shaft may be directly coupled to the engine shaft, in which case the former will be rotated at uniform speed with the latter, while the intermediate gears are at a standstill.

The invention has, furthermore, for its object the provision of improved means for connecting and disconnecting any one of the gears carried by the engine shaft, to or from the latter.

A further object of the invention resides in the improved organization of the mechanism whereby a gear normally loose on the driven shaft of the device will be coupled thereto, and remain in that condition only during the time that one of the primary gears of the engine shaft is actually corotatively connected therewith.

The invention has also for its object the improved construction of the means whereby the motor shaft may be coupled to any one of the members directly operated thereby, this construction including a radially-movable key adapted to enter an internal key-way which is provided in a member to be connected with the shaft.

Further objects of the invention will hereinafter appear and be particularly defined in the claim.

The invention has been clearly illustrated in the accompanying drawings in which similar characters denote similar parts and in which:—

Figure 1 is a horizontal section of a transmission device embodying my invention.

Fig. 2 is a side view of my improved device.

Fig. 3 is a section on line 3—3 of Fig. 1.

Fig. 4 is a detail view, on an enlarged scale, illustrating the driving shaft and its connection with one of the members to be operated thereby.

Referring to the drawings, the numeral 10 denotes the main driving shaft of the device which may be the engine shaft itself or it may be permanently coupled thereto, as desired.

Mounted for free rotation on this shaft are a series of gears 11, 12 and 13, of which the gears 12 and 13 are shown as being rotatable on ball bearings, while the gear 11 is illustrated as being freely rotatable on plain bushings interposed between it and the shaft 10. The gear 11 is in the present instance used for the purpose of operating the driven member, shown herein as a shaft 14 in axial alinement with the motor shaft 10, in a direction opposite to that of the latter. In other words:—the gear or pinion 11, when in operation, performs the "reverse" drive as follows:—Mounted on a stud 15 held in the casing 16, is an intermediate gear 17 which is driven by the pinion 11 and is in mesh with a gear 18 permanently secured to or keyed on a jack shaft 19 which is journaled in suitable bearings 20 and 21, shown herein as ball bearings held within the casing and protected against dust and dirt by caps 22 and 23. The jack shaft 19 carries at its other end a pinion 24 having a key connection 25 therewith and meshing directly into a gear 26 which is loosely mounted for rotation on a sleeve 27 which constitutes a part of an inner sleeve 28 to which it may be secured against longitudinal sliding movement in any desired manner, as for instance by a pin 29. The particular function of the sleeve 27 is that of a collar whereby the gear 26 will be held against longitudinal movement on the supporting shaft 14 of which the sleeve 28 forms a part, as clearly shown in Fig. 1, the sleeve 28 having at its left-hand end a flange 30 between which and the sleeve flange 31 the hub of the gear 26 will be maintained.

Longitudinal movement of the driven shaft 14 relatively to the motor shaft 10 will be prevented by virtue of the inner sleeve 28 being positioned between a shoulder 32 on the shaft 10, and a washer or collar 33 interposed between the right-hand thereof and the bearing 34 of the casing. It should be understood that in the present instance the construction is such that the reduced portion 35 of the motor shaft is journaled in the inner sleeve 28 of the driven member, as shown.

The inner sleeve 28 is provided with a key 36 which serves to rotatively connect a spool 37 with the driven member 14, or more particularly speaking with the inner sleeve 28 thereof, and said spool is provided with clutch-teeth 38 adapted to engage or disengage clutch teeth 39 formed on the face of the hub of the gear 26.

Inasmuch as in Fig. 1, the clutch teeth are shown in engagement, it will be seen that the shaft 14 is rotated at a slow speed in a reverse direction from the shaft 10, the active gear train comprising the pinion 11, the intermediate 17, the jack gear 18, the jack pinion 24, the gear 26, and the spool 37, this driving relation remaining in force as long as the pinion 11 is corotatively connected with the shaft 10.

This pinion is now rotatively connected with the shaft 10 by a drop key 40 which is mounted for radial oscillation in a groove 41 provided in the shaft 10 and is pivoted with its other end at 42 to a spool or carrier 43 which is also carried by the shaft 10, but may be moved longitudinally thereof for the purpose of withdrawing the key head 40' from the pinion 11 and bring it into coöperation with either of the keyways 12' and 13' of the gears 12 and 13 respectively, or said head may pass to a position directly under the race ring 44 in which case the pinion and gears 12 and 13 are all loose or disconnected from the shaft 10.

From the foregoing it will be understood that the key head 40' should be so constructed that it can be slid longitudinally from the key groove of one gear into that of the adjacent gear, in either direction, and for this reason the head is beveled in its opposite side faces, as clearly shown at 40", and it is supported by a spring 140 the upper end of which enters a corresponding recess in the head, while its lower end is supported on a drag shoe 141 which is pivotally attached at 142 to the main body of the key 40.

When the carrier 43 is shifted to bring the key head 40' into the key-way 12' of the gear 12, a driving connection is established in the same direction between these two shafts, but at a slow speed, by virtue of the gear 12 directly driving a jack gear 45 which is also keyed to the jack shaft and, therefore, drives the latter, leaving all the other driving connections between the jack pinion 24 and its connected elements the same as before.

When the key head 40' is brought into engagement with the key-way 13' of the gear 13, the jack shaft is driven from said gear through a pinion 46 also keyed upon said jack shaft, and inasmuch as in that instance the gear ratio is different, said jack shaft will then be rotated at a higher rate of speed, such speed being considered the "intermediate."

If it is desired to drive the driven member 14 at the "high speed," the spool 43 is shifted along the shaft 10 toward the right until the head 40' is clear of all the grooves, or until it comes to a position below the race ring 44, in which position the spool or carrier 43 becomes directly coupled to the inner sleeve 28 of the driven shaft 14 by virtue of teeth 47 of the carrier becoming interlocked with clutch teeth 48 formed on the flange 30 of the sleeve 28; and in order to stop all rotation of the gears 11, 12 and 13, as well as the jack shaft 19 and the parts connected therewith, means are provided whereby the gear 26, or more particularly speaking its teeth 39, are released from the driven shaft 14 or from any member controlled thereby, as for instance the spool 37 above mentioned and its teeth 38. In other words:—When a direct engagement is effected between the clutch teeth 47 and 48, the clutch teeth 38 and 39 are in disconnected condition, and vice versa.

In order to effect these conditions automatically and at the proper time, the spool or carrier 43 and the spool 37 are controlled by the movement of a single member which comprises a longitudinally movable or shiftable rod 50 mounted for such movement in the casing and having a fixed shipper fork 51 engaging a groove in the carrier 43, and a loose shipper 52 which is normally held in the position shown in Fig. 1 by a spring 53, it being understood that the movement of the shipper 52 toward the left will be limited by the engagement between the clutch teeth 38 and 39.

From the description above given it will be remembered that as long as the drop key 40 is in engagement with any one of the gears 11, 12 and 13, the connection between the clutch teeth 38 and 39 remains intact, and for this reason the shipper 52 should not be operated until the key head 40" is entirely out of engagement with either of said gears. For this reason a collar 53 is secured to the sliding rod at such a point that said rod may have a longitudinal movement to effect a complete disengagement between the key head 40" from any and all of the gears, before it engages the shipper 53. As soon as the key head 40" is clear of the gears, the clutch teeth 47 and 48 may be brought into engagement by the continued longitudinal movement of the rod 50, it being understood that when these teeth are in full engagement the shipper 52 will be moved far enough to bring the clutch teeth 38 and 39 out of engagement, therefore letting all of the gears remain idle or at a standstill. This condition constitutes the "high speed" or direct connection between the engine shaft and the driven shaft.

Any suitable means may be employed for imparting longitudinal movement to the rod 50, the construction shown in the accompanying drawings being merely elementary and comprising a lever 54 which may be secured to a manually operable shaft 55.

In recapitulation of the operation of my improved device, particular emphasis is laid upon the fact that the present mechanism permits the operator, by a quick movement of his hand, to go from "full speed ahead" to "reverse", without necessarily stopping at any of the intermediate points or speeds, this action being accomplished by the movement of the shipper rod from its extreme right-hand position to that shown in Fig. 1, in which case the key-head 40' would simply slide beneath the inner race rings and the bores of the gears 12 and 13, the key-ways of which cannot enter unless the head is brought to a standstill in direct radial alinement with such key-ways. In other words:— In order to couple any one of the gears 11, 12 and 13 with the engine shaft, the shipper rod must be brought to a stop at such point where the key head 40' can enter the key-way of that one particular gear.

Attention is called to Fig. 4 in which I have illustrated another feature of my invention which is particularly adapted for use in connection with the mechanism above described. The usual practice in cutting key-ways is that of cutting a slot through the device, longitudinally of the shaft, this slot being of a width substantially equal to the width of the key to be entered thereinto. Inasmuch as in the present instance the gears 11, 12 and 13 are "selective" the following description will apply to all of them.

It will be noted that the key head 40" can commence to move into its operative position, when it reaches the point $a$, the stock of the gear 11 being cut away as shown at 11", so as to allow the key to arrive at its full outward position in a gradual manner and without the necessity of having the key groove 41 and its key head come into exact register with the key slot in the gear, this construction being particularly useful in cases where the speed of the driving shaft 10 is of great velocity, in which case the peripheral speed of the shaft may be so great that a liability exists that the key may be carried by the key slot in the gear before it has a chance to enter it.

Changes may be made in the general organization, as well as in the particular construction of some of the component elements of the device without departing from the spirit of the invention, especially in the manner of mounting the several gears for rotation, in the manner of operating the sliding key for connecting and disconnecting the several gears of the series with the driving shaft, and also in the manner of corotatively connecting and operating the clutch devices above described.

I claim:—

The combination of a driving shaft, a jack shaft, a series of loose wheels on one of said shafts and a corresponding number of fixed wheels on the other shaft, of a driven shaft, means for rotating the latter from the jack shaft, a key having a recess movable longitudinally and radially to connect any one of the loose wheels with its shaft, a spring seated in said recess for normally moving said key radially outwardly, and a drag shoe pivoted with one end on said key for supporting said spring.

In testimony whereof I affix my signature in presence of two witnesses.

ELIJAH W. POTTS.

Witnesses:
 CHAS. F. SCHMELZ,
 H. D. MACDOANLD.